(12) United States Patent
Weiss-Vons

(10) Patent No.: US 8,186,642 B2
(45) Date of Patent: May 29, 2012

(54) PORTABLE DEVICE ACCESSORY

(76) Inventor: John Weiss-Vons, New York, NY (US)

(*) Notice: Subject to any disclaimer, the term of this patent is extended or adjusted under 35 U.S.C. 154(b) by 263 days.

(21) Appl. No.: 12/342,877

(22) Filed: Dec. 23, 2008

(65) Prior Publication Data

US 2010/0155550 A1    Jun. 24, 2010

(51) Int. Cl.
*A47G 29/00* (2006.01)
(52) U.S. Cl. .................. 248/683; 248/205.5; 248/205.8; 248/205.9; 248/206.2; 248/206.3; 248/206.4
(58) Field of Classification Search ............... 248/205.6, 248/363, 205.5, 205.8, 206.4, 206.3, 206.2, 248/205.9
See application file for complete search history.

(56) References Cited

U.S. PATENT DOCUMENTS

| | | | |
|---|---|---|---|
| 2,385,977 A | | 10/1945 | Farmer |
| 2,412,396 A | * | 12/1946 | Hanna ......................... 242/396.2 |
| 2,777,141 A | * | 1/1957 | Nye ................................. 15/105 |
| 2,910,264 A | | 10/1959 | Lindenberger |
| 3,071,886 A | | 1/1963 | Stiller |
| 3,879,005 A | | 4/1975 | Flick |
| 4,196,882 A | | 4/1980 | Rognon |
| 4,802,211 A | | 1/1989 | Huntley |
| 5,011,316 A | | 4/1991 | Damon |
| 5,190,332 A | | 3/1993 | Nagai et al. |
| D357,170 S | | 4/1995 | Wellsfry |
| 5,553,908 A | | 9/1996 | Shink |
| 5,568,549 A | | 10/1996 | Wang |
| 5,782,516 A | | 7/1998 | Partida |
| D404,038 S | | 1/1999 | Fransson et al. |
| 6,081,928 A | | 7/2000 | Bourne |
| 6,143,391 A | * | 11/2000 | Barnes et al. ................... 428/99 |
| 6,375,143 B1 | | 4/2002 | Burns |
| D521,990 S | | 5/2006 | Richter |
| 7,399,199 B2 | * | 7/2008 | Symons ........................ 439/501 |
| 7,644,895 B2 | * | 1/2010 | Tseng ........................... 248/126 |
| 2007/0278369 A1 | | 12/2007 | Yu |
| 2008/0116336 A1 | | 5/2008 | Hsiung |

FOREIGN PATENT DOCUMENTS

GB    683290 A    11/1952

OTHER PUBLICATIONS

International Searching Authority, The International Search Report and The Written Opinion of the International Searching Authority, Mar. 1, 2010, pp. 1-14, PCT, U.S.

* cited by examiner

*Primary Examiner* — Amy J Sterling
(74) *Attorney, Agent, or Firm* — Libby Babu Varghese, Esq.; Carter Ledyard & Milburn LLP

(57) ABSTRACT

A portable device accessory is used to hold, grip or manipulate a portable device such as and not limited to mobile phones, MP3 players, portable entertainment/computing devices, and/or gaming devices. The accessory possesses two suctions cups connected by a neck and having an aperture for receiving a jack on earphone. Certain embodiments of the accessory will have tabs, ridges, groove and/or a space to receive earphones. The accessory permits a jack of earphones to be threaded through an aperture and the cord of the earphones to be wrapped around the accessory. The suction cups may be inverted to conceal the cord wrapped around a neck of the accessory and tabs may be used to hold inverted suction cups together.

6 Claims, 11 Drawing Sheets

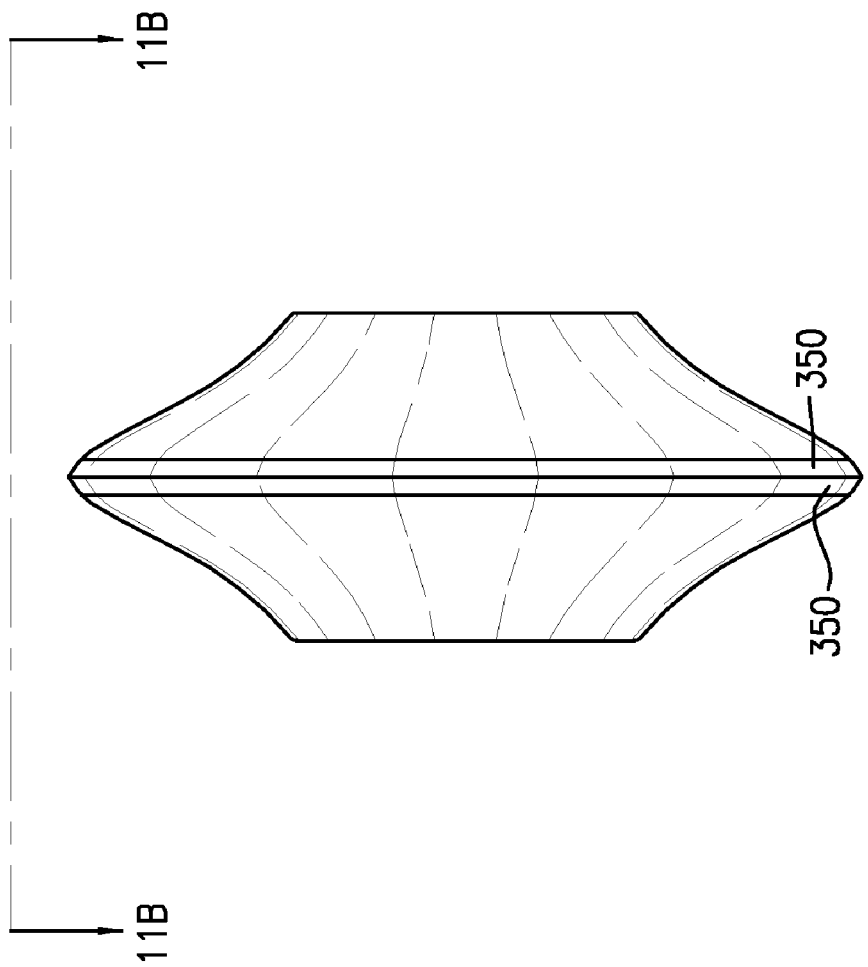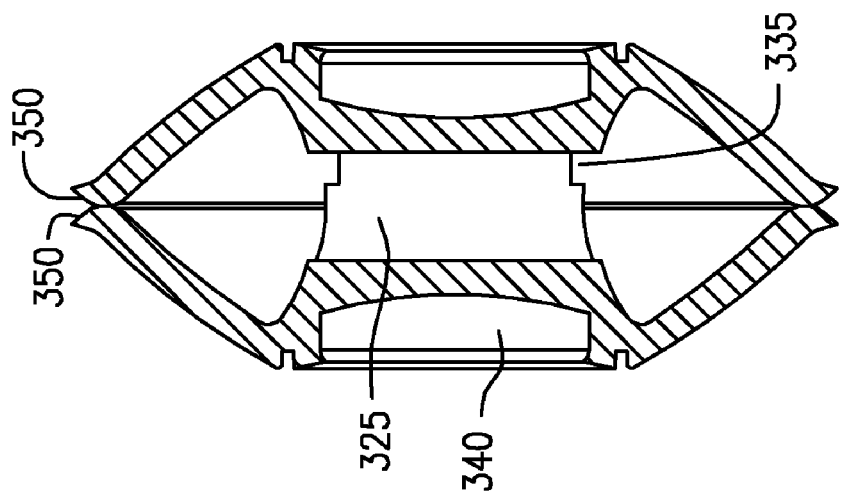

PORTABLE DEVICE ACCESSORY

PRIORITY AND RELATED APPLICATION

N/a.

FIELD OF THE INVENTION

The present invention relates to an accessory for a portable device, specifically to an accessory for gripping a portable device and retaining and storing items related to the portable device.

BACKGROUND OF THE INVENTION

Today, portable devices are a common item in every day life. Most individuals possess at least one portable device. Such devices include and are not limited to mobile phones, MP3 players, portable entertainment/computing devices, and/or gaming devices. The increase of functions and applications for mobile phones has required a great increase of usage time with these devices. People are now becoming increasingly more intimate and personal with their portable devices as they serve multiple purposes such as communication and entertainment purposes. Due to the increased time of use with these devices, a person's arms and hands can become tired from their positioning and limited grasp.

An accessory device is desired that can grip, hold, position and operate a portable device. It is also desired that an accessory device be able to retain wires or cords related to the portable device, such as a headphone cord or power cord.

An object of the accessory device is to provide an extra area by which the portable device may be held and/or manipulated such as during gaming. For instance the portable device may be held between fingers to grip the accessory device as it is simultaneously being held by a user.

An object of the accessory device is to serve as an intermediary surface wherein a portable device can be removably attached to the accessory device and can also be removably attachable to a surface.

BRIEF SUMMARY OF THE INVENTION

A portable device accessory of the present invention includes dual suction cups connected by a neck used to hold, grip or manipulate a portable device such as and not limited to mobile phones, MP3 players, portable entertainment/computing devices, and/or gaming devices. The accessory also can possess at least one tab on each suction cup, an aperture disposed on the neck, at least one ridge, at least one groove and/or an earphone space on a concave side of the suction cup. The aperture on the neck permits a cord or wire to be threaded through the neck, while the at least one ridge or at least one groove is designed to receive a width of the cord or wire when the cord or wire is wrapped around the neck. The at least one tab may be used to hold a cord or wire in place when the suction cup is in a open state or the tabs may be used to hold the suction cups in an closed state when each rim on the suction cups are pulled back over the neck.

In use, one suction cup may be releasably suctioned to the back of a portable device to better grip the portable device or position the portable device on a surface. In another example, both suction cups may be used wherein one suction cup is releasably suctioned to a portable device and the corresponding suction cup is releasably suctioned to a surface such as a wall.

Accordingly, it is a principal object of the invention to provide a portable device accessory that properly permits a user to better grip a portable device.

It is another object of the invention to provide a portable device accessory which permits a user to hold a portable device with comfort in the palm of the hand or against the back of the hand.

It is a further object of the invention to provide a portable device accessory that can be used as a kickstand to prop a portable device on a horizontal surface.

Still another object of the invention is to provide a portable device accessory that helps the user to retain a portable device and simultaneously retain an earphone cord or power cord.

Yet another object of the invention is to provide a portable device accessory that helps the user to store earphone cord or power cord in an orderly and organized manner and also be concealed from the elements.

A further object of the invention is to provide a portable device accessory where suction cups can invert back over a neck area to be compact when traveling in a user's pocket.

Another object of the invention is to provide a portable device accessory where inverted suction cups aid to further secure and protect a cord that is wrapped thereabout for travel or storage.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

FIG. 11A is side view of the third embodiment of the present invention in a closed, inverted state.

FIG. 11B is a sectional view of the third embodiment of the present invention taken along line 11B-11B in FIG. 11A.

DETAILED DESCRIPTION OF THE INVENTION

Figure 1:
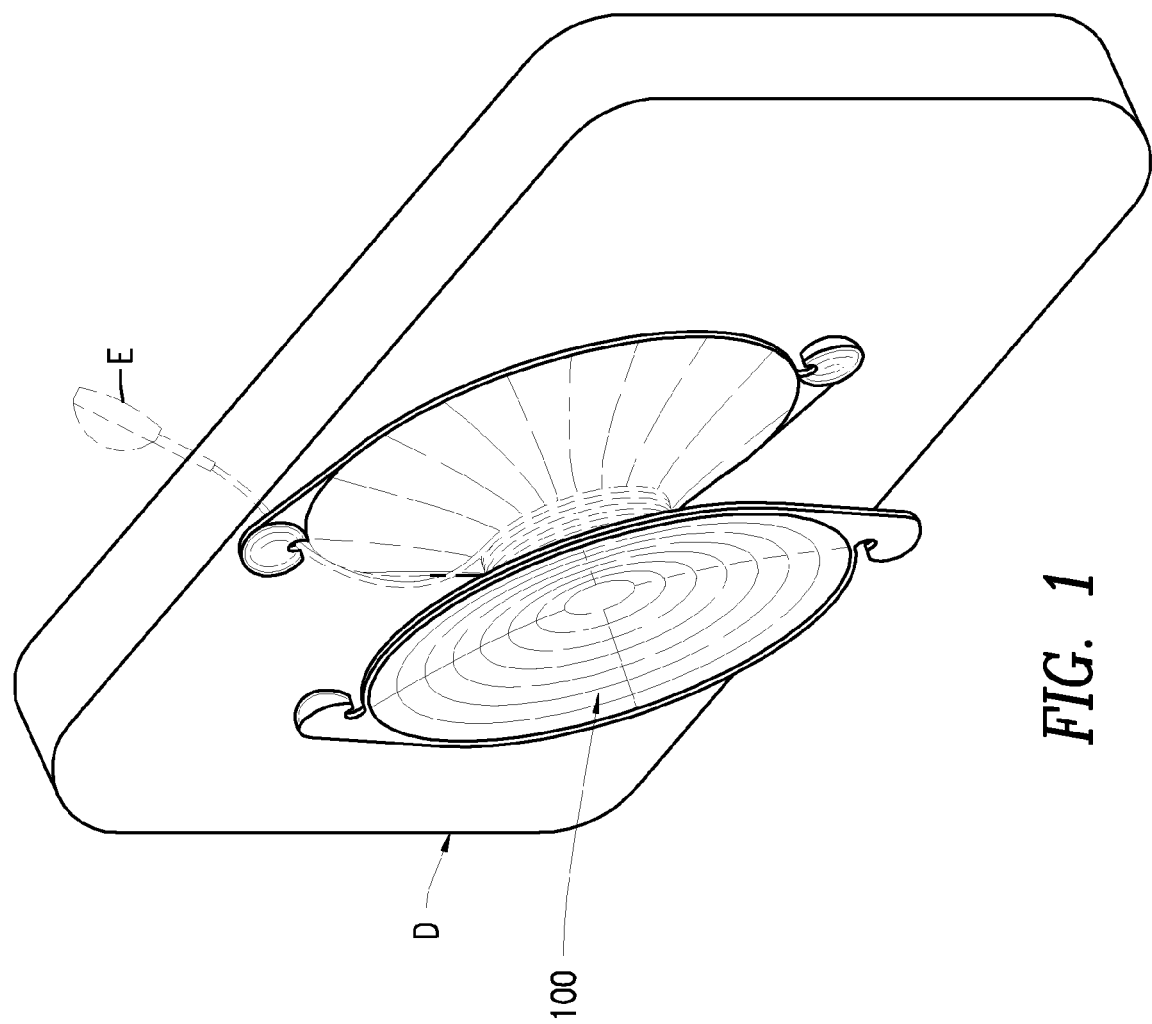
FIG. 1 is environmental perspective of a first embodiment of the present invention.

Referring now to the drawings, where like numerals represent like parts, a portable device accessory 100, 200, 300 incorporating the principles of the present invention is generally illustrated in the figures. Three embodiments of the present invention are shown in the figures. FIGS. 1-5B show the first embodiment, FIGS. 6-8B show the second embodiment and FIGS. 9-11B show the third embodiment.

FIG. 1 shows an environmental perspective view of the first embodiment of the portable device accessory 100 of the present invention disposed on the back of a portable device D, such as a phone. An earphone cord is wrapped around the accessory 100 with the cord adjacent the earphone E being tucked within and held by the accessory 100. Other examples of portable devices include and are not limited to mobile phones, MP3 players, portable entertainment/computing devices, and/or gaming devices. Referring now to FIGS. 2A-4B, the accessory 100 is shown having two suction cups 110, 110' and a neck 120 connecting the two suction cups. The suctions cups 110, 110' each have a concave side, a convex side, a rim 150 with tabs 115 disposed on the rim 150. The convex sides of each suction cup 110 are connected together by the neck 120. An aperture 125 is disposed through the neck 120 providing a channel having a first open end and a second open end.

The concave sides of each suction cup 110, 110' is designed to operate in a customary manner by suctioning to a surface. FIG. 1 shows the device suctioned to the back of a telephone. Each the convex sides of the suction cups 110, 110' slope or taper down to the neck providing a groove to accommodate an earphone cord or power cord around the neck 120. The orientation of the suction cups 110, 110' and the neck 120 also provides an area in which a user may hold the accessory 100 and any device D attached thereto between the user's fingers. The aperture 125 defines a passageway to accommodate a cord used with any portable device D. A jack on a cord may be threaded through the aperture 125 and then the cord may be wrapped around the neck 220 to aid in securing the cord to the accessory 100 so that the device D and the cord stays together.

Each suction cup 110, 110' is shown with two tabs 115 disposed at the rim 150. The number of tabs on one suction cup 110 can equal the number of suction cups on the corresponding suction cup 110'. Two tabs 115 are shown on each suction cup 110, however the number of tabs are not meant to be limiting as there may be one tab or more than one tab disposed on each suction cup 110, 110'. Some embodiments may not possess tabs, see the third embodiment further below.

Figure 3:
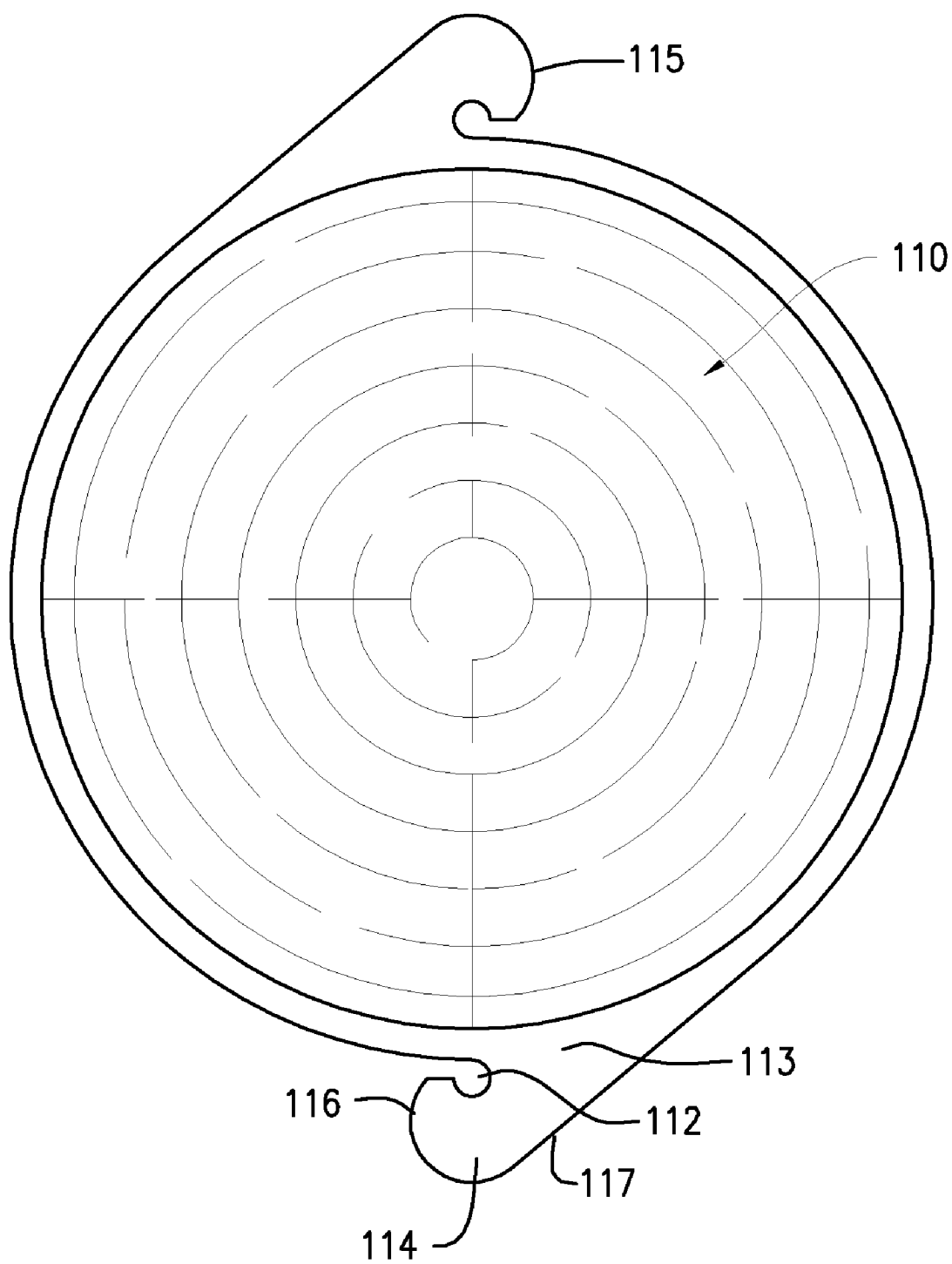
FIG. 3 is front plan view of the first embodiment of the present invention.
Figure 4A:
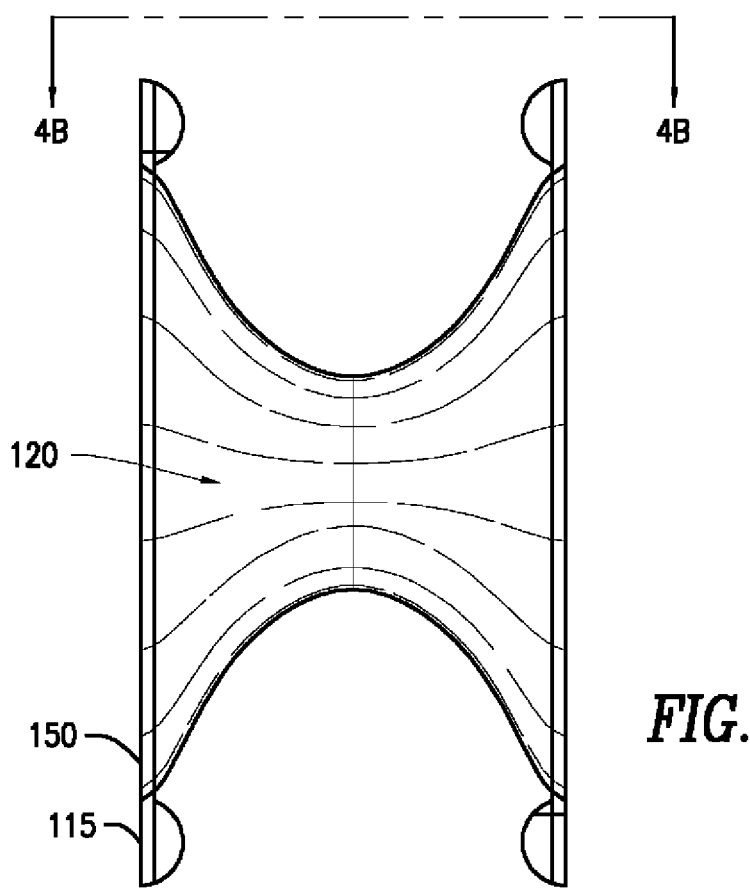
FIG. 4A is side view of the first embodiment of the present invention.
Figure 4B:
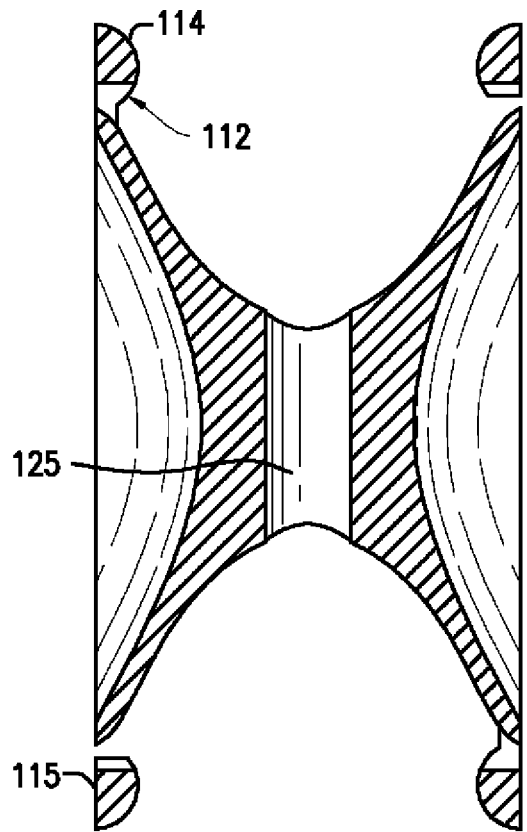
FIG. 4B is a sectional view of the first embodiment of the present invention taken along line 4B-4B in FIG. 4A.
Figure 5A:
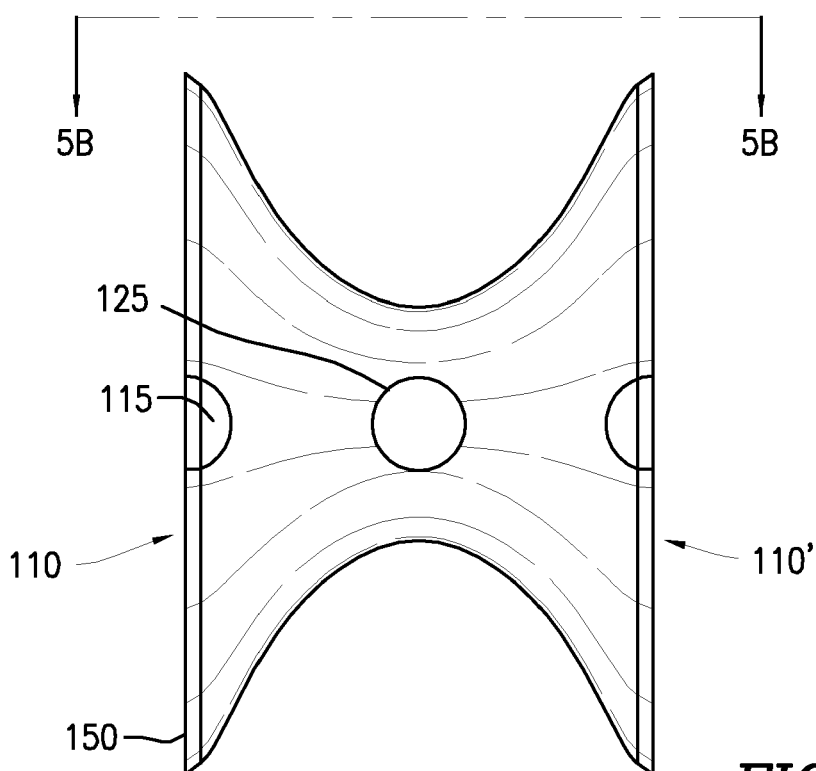
FIG. 5A is top view of the first embodiment of the present invention.
Figure 5B:
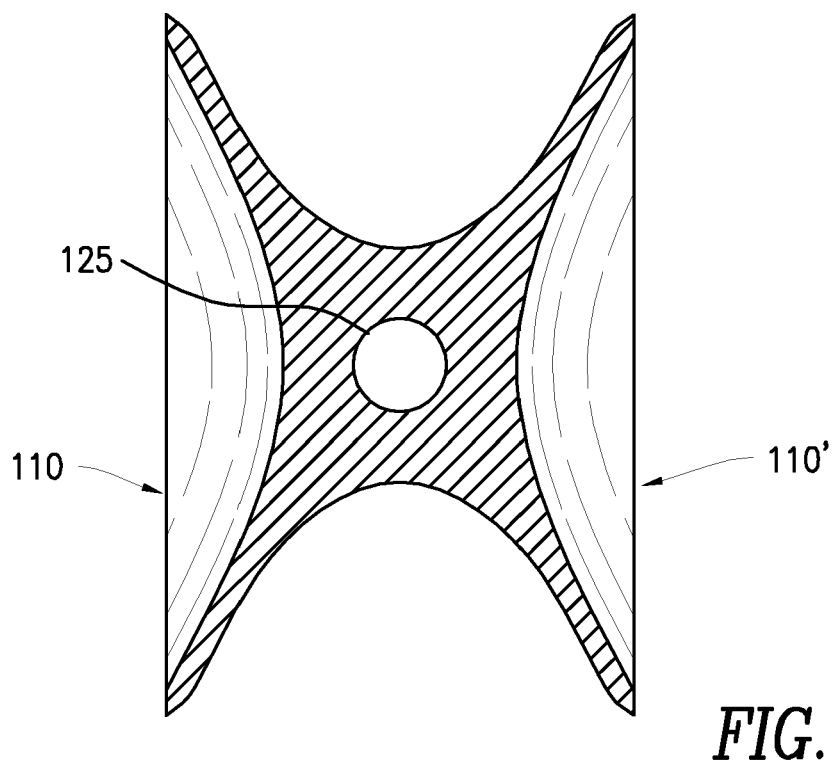
FIG. 5B is a sectional view of the first embodiment of the present invention taken along line 5B-5B in FIG. 5A.
Figure 6:
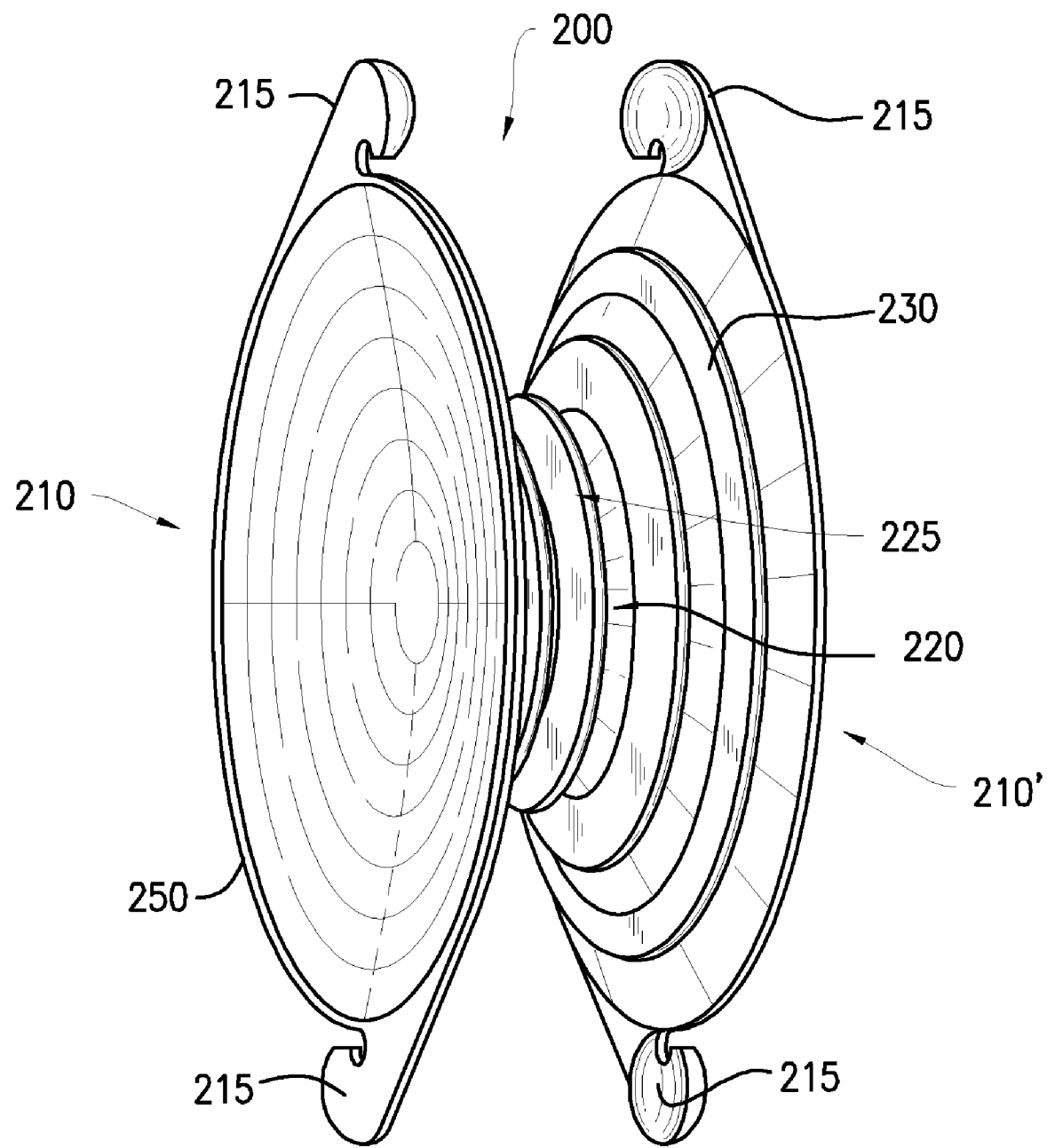
FIG. 6 is a side perspective view of a second embodiment of the present invention.
Figure 7A:
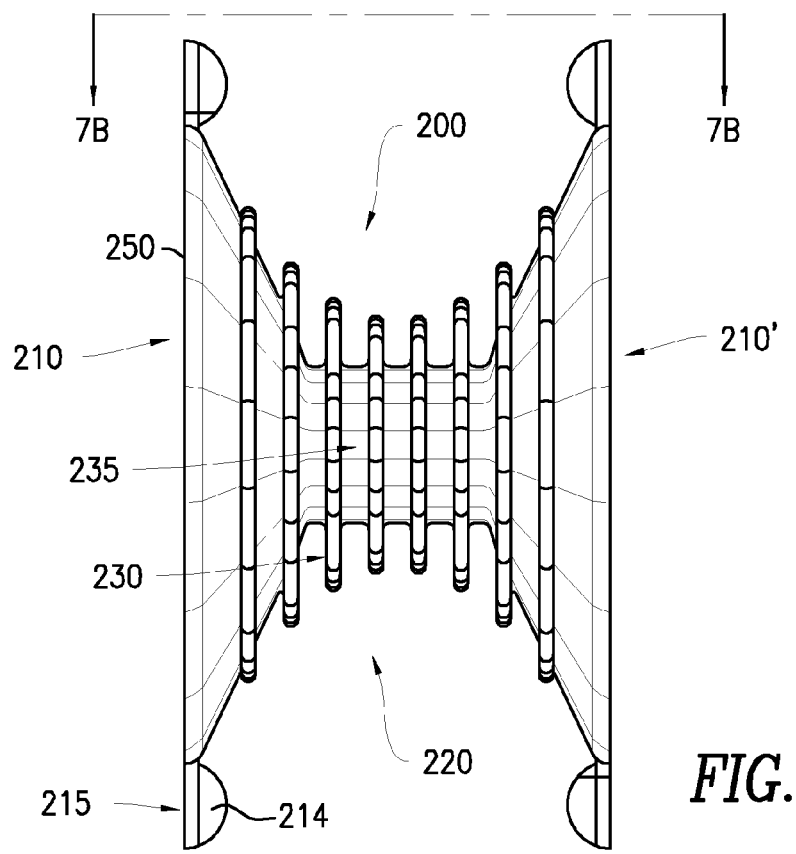
FIG. 7A is side view of the second embodiment of the present invention.
Figure 7B:
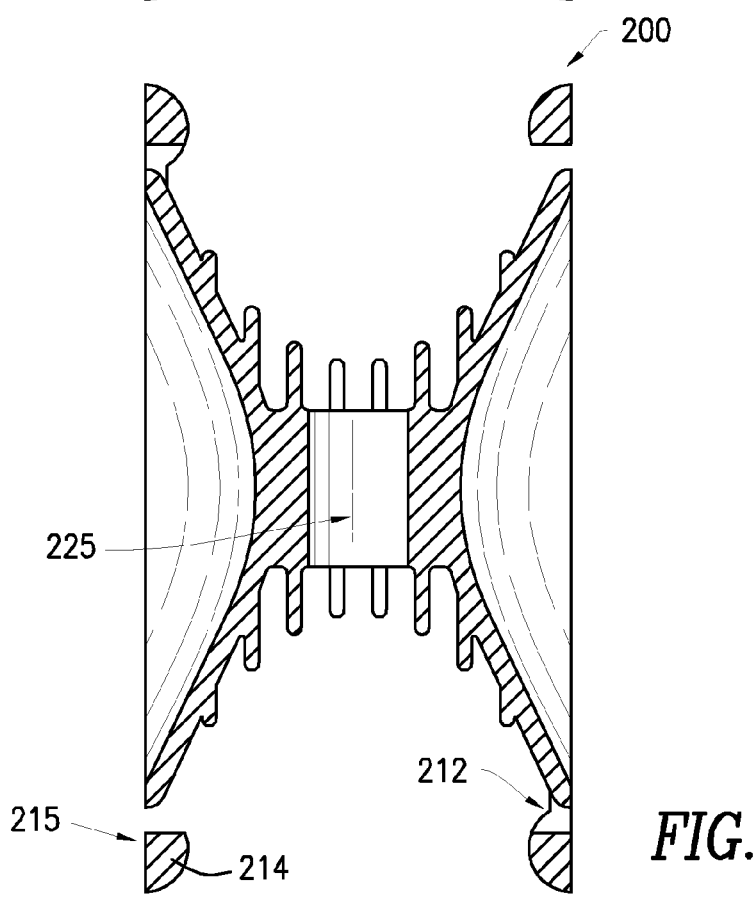
FIG. 7B is a sectional view of the second embodiment of the present invention taken along line 7B-7B in FIG. 7A.
Figure 8A:
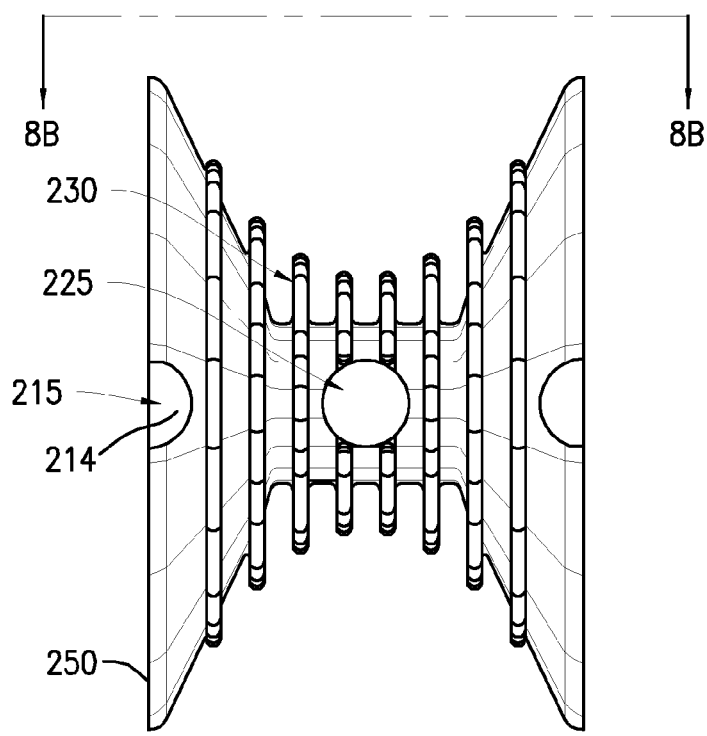
FIG. 8A is top view of the second embodiment of the present invention.
Figure 8B:
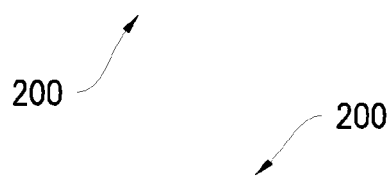
FIG. 8B is a sectional view of the second embodiment of the present invention taken along line 8B-8B in FIG. 8A.
Figure 8B:
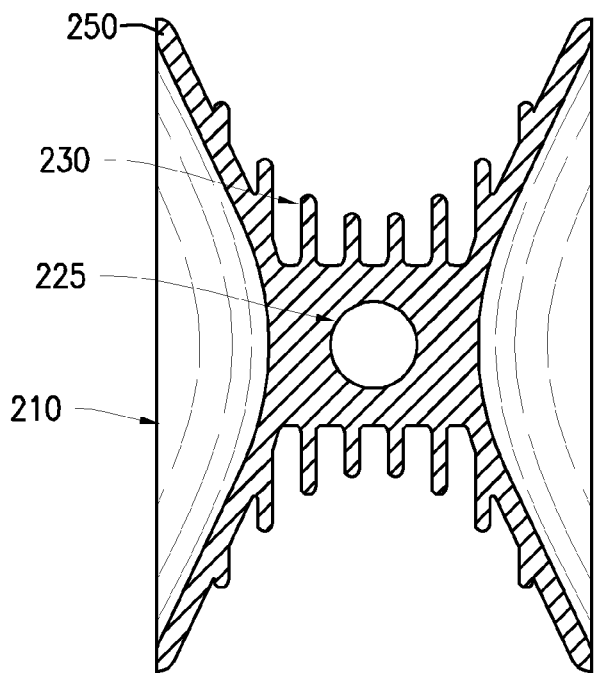

Referring to FIG. 3 and suction cup 110, the tabs 115 may be oriented on the rim 150 to be opposite the other. In one embodiment, the tabs 115 may be disposed at 180 degrees opposite from the other tab. The tabs 115 may take any shape. FIG. 3 shows the tabs 115 being elliptically shaped and angled having a first end 113, a second end 114, an inner side 116 and an outer side 117. The first end 113 is attached to the outer rim 150 with a notch 112 being disposed at a junction where the inner side 116 meets the rim 150 of the suction cup 110. The second end 114 of the tab 115 is thicker than the first end 113, see FIGS. 4A and 4B. Advantages of the thicker second end 114 will be discussed below.

Figure 2B:
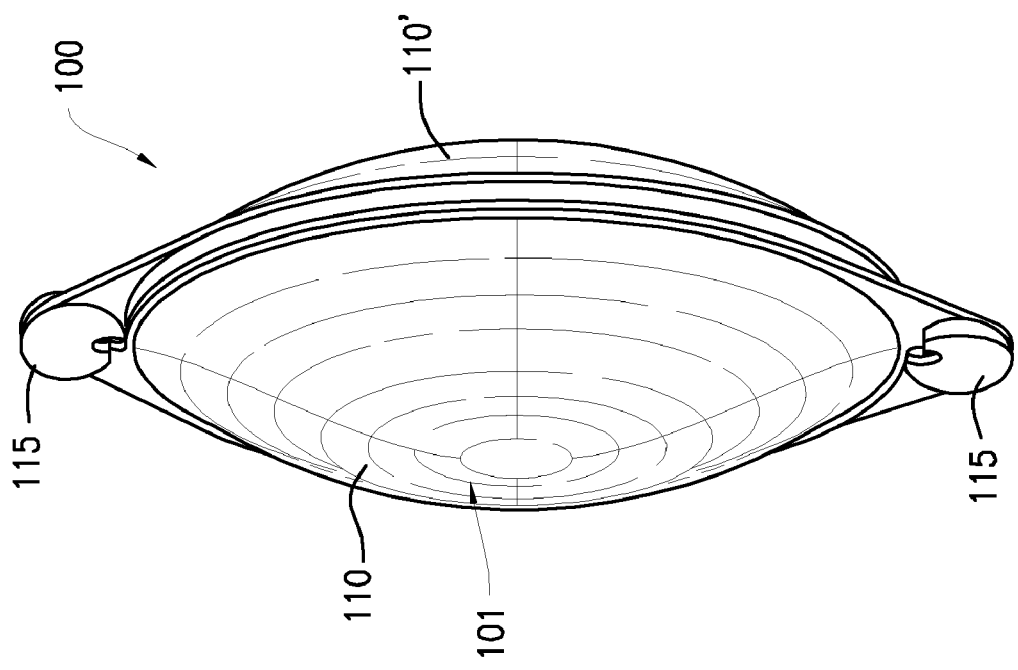
FIG. 2B is side perspective view of the first embodiment of the present invention in a closed, inverted state.
Figure 2A:
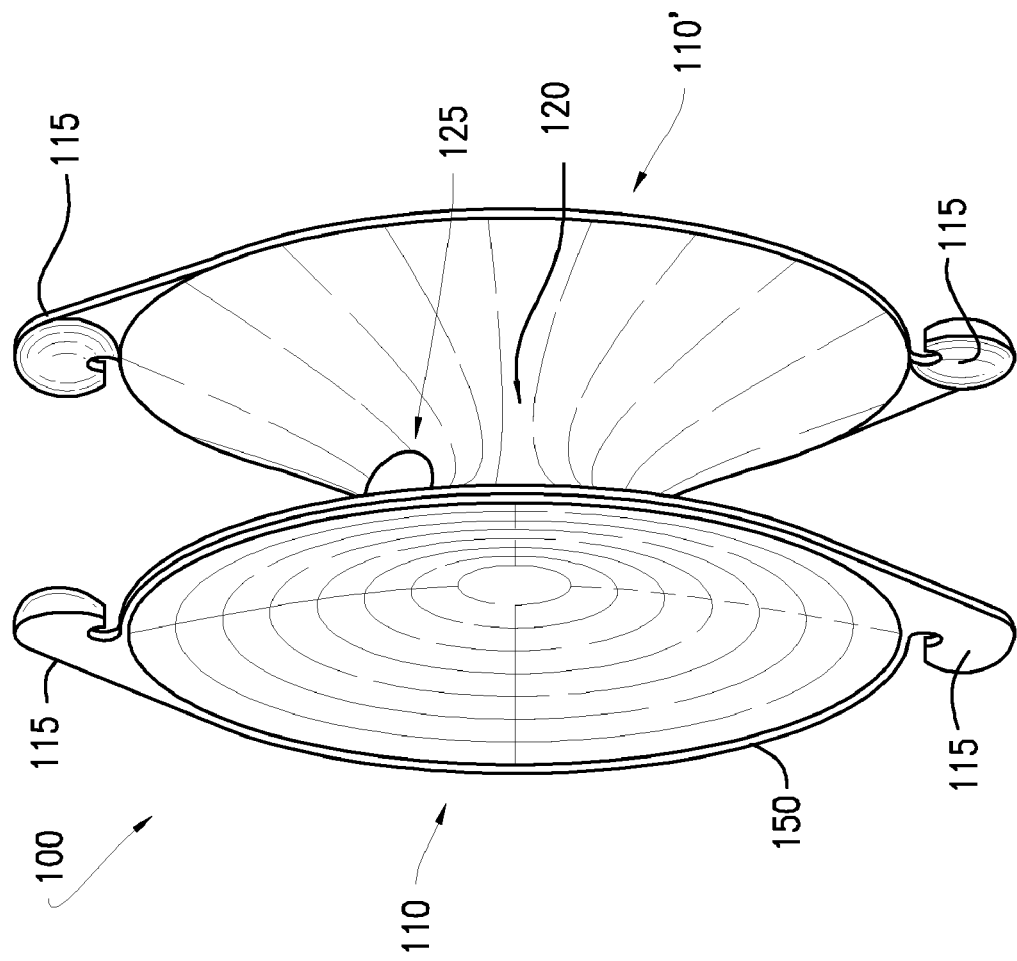
FIG. 2A is side perspective view of the first embodiment of the present invention in an open state.

The tabs 115 on suction cup 110 are inverse to the corresponding tabs 115 on the suction cup 110'. Looking at FIGS. 2A and 3, the location of the notches 112 display the orientation of at least two tabs on a suction cup. FIGS. 2A and 3 show that each tab on suction cup 110 face one direction, while each tab on the suction cup 110' face the opposite direction. The tabs 115 on suction cup 110 are aligned with tabs 115 on the suction cup 110' to allow a user to pinch the tabs together and hook the two tabs at the notches 112. See FIG. 2B. The tabs 115 on one suction cup 110 slide into the tabs 115 of the matching suction cup 110' and are clasped at the notches 112 allowing each tab on one suction cup 110 to releasably mate with the corresponding tab on the suction cup 110'. The tabs 115 act similar to a kiss clasp used on a woman's purses. The benefit of having a thickened second end 114 is that the intertwined tabs on the two suction cups 110, 110' can stay in position and releasably mate. Please note that when each the first suction cup 110 and the second suction cup 110' are inverted and in this closed position, the rim 150 of the first suction cup 110 abuts the rim 150 of the second suction cup 110', see FIG. 2B.

Another feature of the tabs 115 is that in use, a user may wind an earphone cord around the neck 120 and insert the earphone cord through the notch 112 of one tab and then through the notch 112 of the opposite tab to secure the cord in place. Still another feature provided with the notches 112 at the tabs 115 is that once a cord is wrapped around the neck 120, the suction cups 110, 110' can be closed or inverted wherein the rims 150 on each suction cup meet and the tabs 115 on each suction cup 110, 110' can releasably mate. Here, a user may be able to leave the earphones depending from an earphone cord outside of the accessory 100 so that the portion of the cord nearest ear buds sit firmly secured within the notch 112 and below the tabs 115 thereby avoiding any unraveling of the cord from the neck 120 of the accessory 100. See FIG. 1.

Second Embodiment

FIGS. 6-8B show the second embodiment of the portable device accessory 200. The accessory 200 is shown having two suction cups 210, 210', a neck 220 connecting the two suction cups and an aperture 225 disposed on the neck 220. Accessory 200 further possesses at least one ridge 230 on the neck 220 and convex sides of each suction cup 210 and 210' to define at least one groove 235. The accessory 200 shows a plurality of ridges 230 and grooves 235. The ridges 230 and grooves 235 do not obstruct the aperture 225 and are coaxial. The ridges 230 and grooves 235 are dimensioned and configured to the width of a cord such as an earphone cord or power cord so that a user may orderly wrap the cord around the neck 220. The tabs 215 may then be interlocked to pinch the ends and secure the cord around the neck 220 in the grooves 235 and ridges 230. The second embodiment 200 though shown with the tabs 215 may also be made without tabs in certain embodiments. It should be noted that the first suction cup 210 and the second suction cup 210' can be inverted and closed so that rim 250 of the first suction cup 210 abuts the rim 250 of the second suction cup 210'. The accessory 200 in the inverted, closed state would resemble FIG. 2B as shown for the first embodiment.

Third Embodiment

Figure 9:
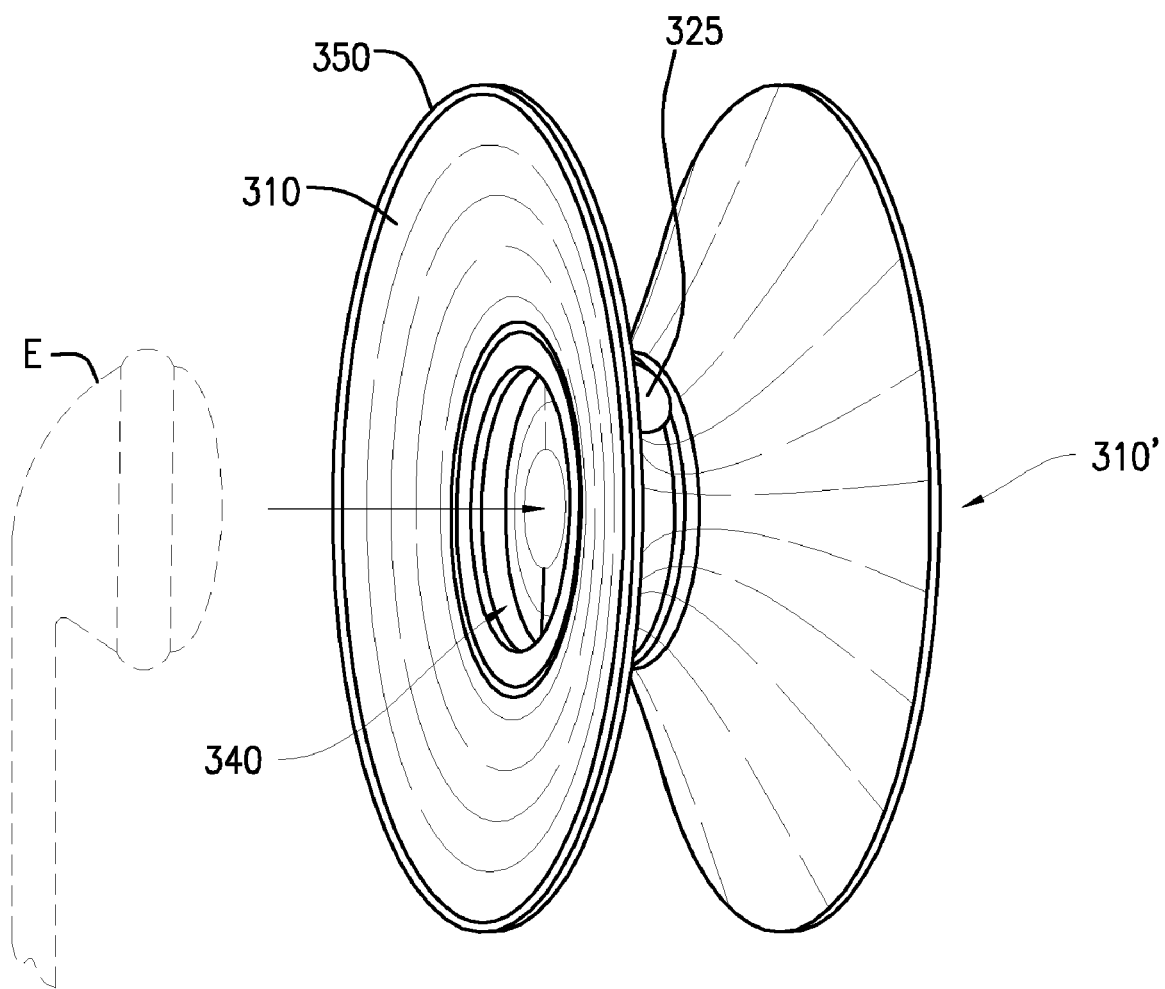
FIG. 9 is a side perspective view of a third embodiment of the present invention.

FIGS. 9-11B show the third embodiment of the portable device accessory 300. The accessory 300 is shown having two suction cups 310, 310', a neck 320 connecting the two suction cups, at least one groove 335 on the neck 320 and an aperture 325 disposed on the neck 320. Accessory 300 further possesses spaces 340 disposed on the concave side of each suction cup 310, 310'. Each space 340 is dimensioned and configured to receive at least one earphone E. FIG. 9 shows the space 340 being in the centermost area on each suction cup 310, 310', but could easily be accommodated on other areas of the suction cups. The spaces 340 may be used by a user when earphones are not needed and need to be stowed away. Earphones can be stored in the spaces 340 after having threaded a jack through aperture 325 and wrapping the cord around the neck 320.

Figure 10A:
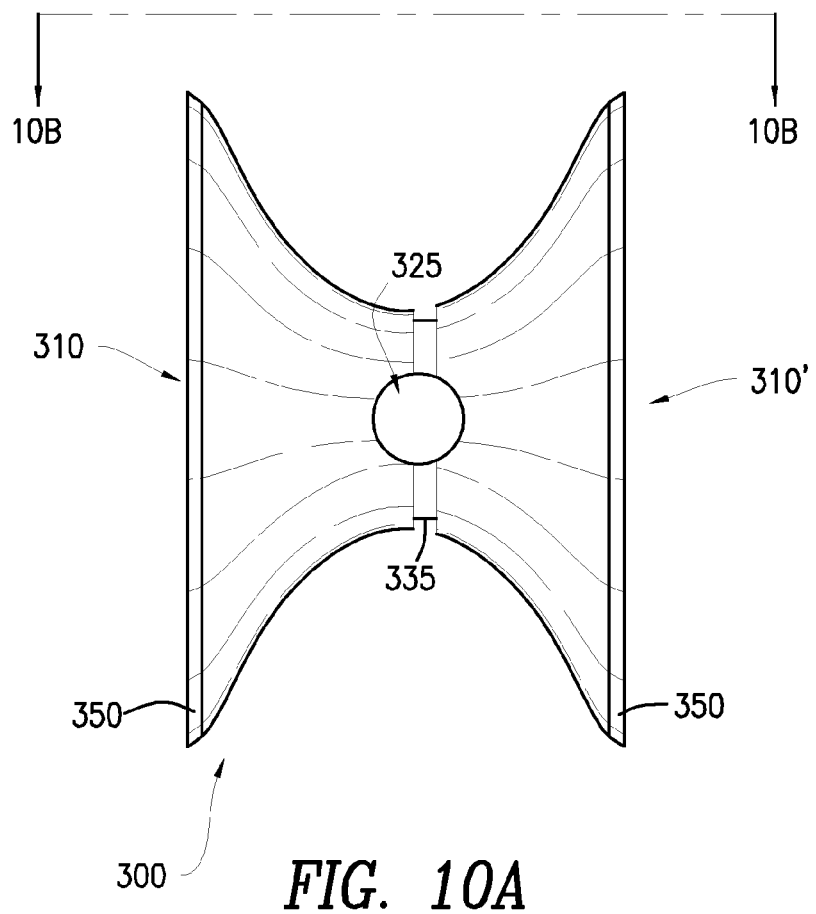
FIG. 10A is top view of the third embodiment of the present invention in an open state.
Figure 10B:
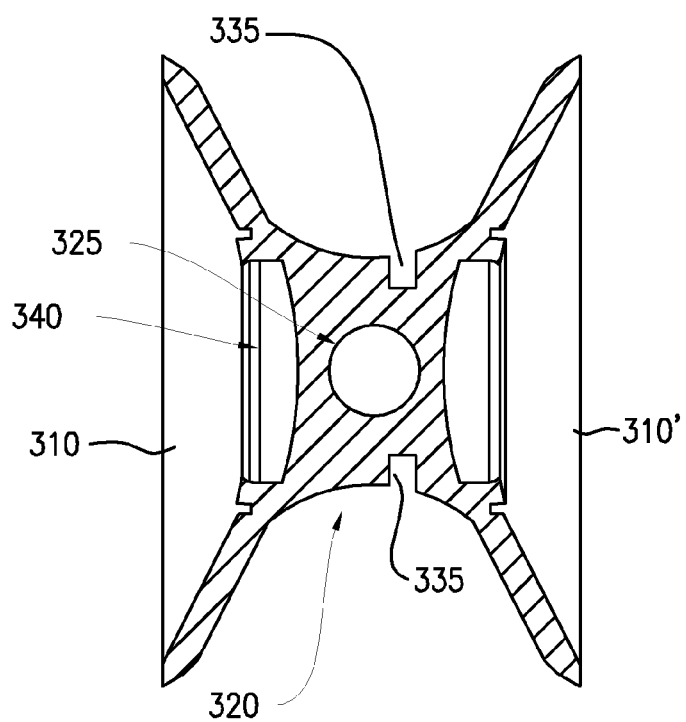
FIG. 10B is a sectional view of the third embodiment of the present invention taken along line 10B-10B in FIG. 10A.

FIGS. 9-10B show the suction cup in the open position. As with the previously described embodiments, the accessory 300 also can be used to wind an earphone cord around the neck 320. In the present embodiment, the neck 320 shows at least one groove 335, which may be dimensioned and configured to receive a cord being wrapped around the neck. FIGS. 11A-11B show the accessory 300 in a closed, inverted position where suction cups 310, 310' are pulled or inverted back to allow the rim 350 on each suction cup 310, 310' to abut each other and thus conceal the neck 320 area. It should be noted that when the accessory 300 in an inverted position the earphone cord may still slip past the rims 350 and not interfere with earphones E disposed in the space 340.

Accessory 100, 200, 300 have each been described with differing elements. The elements should not be limited to that as described above and can be combined or interchanged in a number of ways. For instance, accessory 300 is shown without the ridges 230 or a plurality of grooves 235, as in the second embodiment, or tabs of the first and second embodiments, however such features could be added to the third embodiment 300. Alternatively, the suction cups of the first embodiment 100 and second embodiment 200 may be formed without the tabs 115, 215 so the rims 150 on suction cups 110, 110' and rims 250 of suction cups 210, 210' abut the other when the suction cups are disposed in an inverted or closed position.

The accessory 100, 200, 300 may be made of any material and should not be limited by the material used in manufacturing.

In one aspect of the invention, the accessory 100, 200, 300 is designed to removably adhere a portable device D to a surface. For instance, accessory 100, 200, 300 could be removably adhered to the device D at one end and removably adhered to a perfectly vertical surface, such on a wall at the other end. In another aspect of the invention, the accessory 100, 200, 300 may be removably adhere a portable device D at one end and the opposite end may be left free and used in a variety of ways. For instance, the accessory 100, 200, 300 may be removable adhered to a device D and the accessory 100, 200, 300 could be gripped between fingers so the device D rests on the palm of a users hand or back of a users hand. Another way the accessory 100, 200, 300 removably adhere a portable device D could be used is to cradle or balance the device D and the accessory 100, 200, 300 on a shoulder below the user's ear especially if the device is a phone that the user is speaking into. Here, the free end of the accessory would be placed and balanced by the shoulder.

Another method of using the accessory 100, 200, 300 with a device D is by using the accessory 100, 200, 300 on the face of a device D to maneuver the device D. This feature of the invention is especially useful if the device D is an electronic device possessing a video game that use accelerometers to accommodate video games. In such instances, the device D is manipulated by physically moving the device around, here the accessory 100, 200, 300 could be placed on the face of the device D and the user's movement with the electronic device is registered to perform many functions with the video games—ie. turning the device to steer a car in a vertical position or tilting the device horizontally to move an object with gravity. In another aspect of this invention, one suction cup can be held firmly still with one hand by the user while the other hand can rotate and turn the device D thus mimicking the steering wheel of a car for example.

Still a further method of using the accessory 100, 200, 300 is to prop the device D and the removably adhere accessory 100, 200, 300 as a kickstand and thus angle the device for easy viewing against a surface. For instance, the device D and accessory 100, 200, 300 could be placed on an airplane fold down table and angled up for easy viewing.

While the invention has been described by way of example and in terms of specific embodiments it is not so limited and is intended to cover various modifications as would be apparent to those skilled in this art area. Therefore, the scope of the appended claims should be accorded the broadest interpretation so as to encompass all such modifications.

The invention claimed is:

1. A portable device accessory comprising:
a first suction cup having a concave side and a convex side, said first suction cup having an outer rim, at least one first tab disposed on said outer rim, said first tab having a first end, a second end, an inner side an outer side and a notch being disposed at a junction where said inner side meets the outer rim of said first suction cup, wherein said first tab is elliptically shaped and radiates at an angle from said outer rim, wherein said first tab is parallel with the first suction cup,
a second suction cup having a concave side and a convex side, said second suction cup having an outer rim, at least one matching tab disposed on said outer rim, said at least one matching tab having a first end, a second end, an inner side and an outer side, and a notch being disposed at a junction where said inner side meets the outer rim of said second suction cup, said at least one matching tab being aligned with and inversely oriented with said at least one first tab, wherein said matching tab is elliptically shaped and radiates at an angle from said outer rim, wherein said second tab is parallel with the first suction cup;
a neck connecting said convex side of said first suction cup with said convex side of said second suction cup; and
an aperture disposed through said neck, said aperture having a first open end and a second open end, said aperture being uninterrupted and continuous from said first open end and said second open end,
wherein said notch is dimensioned and configured to releasably receive an earphone cord, said cord being secured in the notch when said cord is received in the notch.

2. The portable device accessory of claim 1, wherein said at said second end of the at least one first tab being thicker than said first end of the at least one first tab, said second end of the at least one matching tab being thicker than said first end of the matching tab, wherein said at least one first tab releasably mates with said at least one matching tab and the outer rim of the first suction cup abuts the outer rim of the second suction cup when each the first suction cup and the second suction cup are inverted, wherein said first tab releasably mates with said matching tab by clasping together the notch of each the first tab and the matching tab.

3. The portable device accessory of claim 2, wherein there are at least two first tabs and at least two matching tabs, said at least two first tabs being aligned with said at least two matching tabs to releaseably mate by clasping.

4. The portable device accessory of claim 1, wherein at least one groove is disposed on said neck, said at least one groove is dimensioned and configured to receive a width of a cord.

5. The portable device accessory of claim 1, wherein a space having an opening is disposed in each said concave side of said first suction cup and said concave side of said second suction cup, said space being dimensioned and configured to receive an ear phone.

6. The portable device accessory of claim 5, wherein said space in said concave side of said first suction cup and said space in said concave side of said second suction cup is disposed in a centermost area of said concave side of said first suction cup and in a centermost area of said concave side of said second suction cup.

* * * * *